(12) United States Patent
Toulch

(10) Patent No.: US 11,852,897 B2
(45) Date of Patent: Dec. 26, 2023

(54) EYEGLASSES AND ASSEMBLY INCLUDING A COMPONENT MOUNTED TO A LENS

(71) Applicant: Michael Toulch, Montreal (CA)

(72) Inventor: Michael Toulch, Montreal (CA)

( * ) Notice: Subject to any disclaimer, the term of this patent is extended or adjusted under 35 U.S.C. 154(b) by 538 days.

(21) Appl. No.: 17/263,237

(22) PCT Filed: Sep. 11, 2019

(86) PCT No.: PCT/IB2019/057655
§ 371 (c)(1),
(2) Date: Jan. 26, 2021

(87) PCT Pub. No.: WO2020/074980
PCT Pub. Date: Apr. 16, 2020

(65) Prior Publication Data
US 2021/0157166 A1    May 27, 2021

Related U.S. Application Data

(60) Provisional application No. 62/743,934, filed on Oct. 10, 2018.

(51) Int. Cl.
*G02C 1/02* (2006.01)
*F16B 9/00* (2006.01)
*G02C 5/22* (2006.01)

(52) U.S. Cl.
CPC .............. *G02C 1/02* (2013.01); *F16B 9/054* (2018.08); *G02C 5/2209* (2013.01); *F16B 9/056* (2018.08); *G02C 2200/06* (2013.01)

(58) Field of Classification Search
None
See application file for complete search history.

(56) References Cited

U.S. PATENT DOCUMENTS

| 1,414,089 A | 4/1922 | Lemich |
| 2,004,005 A | 6/1935 | McDanal |
| 2,203,219 A | 6/1940 | Jackman, Jr. |
| 2,446,846 A | 8/1948 | Noble |
| 4,037,980 A | 7/1977 | Haentjens |

(Continued)

FOREIGN PATENT DOCUMENTS

| CN | 105607280 | 5/2016 |
| EP | 1182489 | 2/2002 |

(Continued)

OTHER PUBLICATIONS

International search report for PCT application PCT/IB2019/057655 filed Sep. 9, 2019, from which the present application is a national phase entry.

(Continued)

*Primary Examiner* — Darryl J Collins

(57) ABSTRACT

An assembly (10) of a lens (16, 18) and a component (24, 26). The lens (12, 14) defines a mounting aperture (32) and the component (24, 26) defines amounting protrusion (36) inserted in the mounting aperture (32). The lens (16,18) and mounting protrusion (36) together define a threaded bore (34) receiving a threaded fastener (30) therein into. Part of the circumference of the threaded bore (34) is defined by the lens (16, 18) and part of the circumference of the threaded bore (34) is defined by the mounting protrusion (36).

23 Claims, 4 Drawing Sheets

(56) References Cited

U.S. PATENT DOCUMENTS

| | | | |
|---|---|---|---|
| 4,093,011 | A | 6/1978 | Bucknavich |
| 4,848,893 | A | 7/1989 | Grendol |
| 5,073,020 | A | 12/1991 | Lindberg et al. |
| 5,659,380 | A | 8/1997 | Kobayashi |
| 5,684,559 | A | 11/1997 | Lin |
| 5,946,072 | A | 8/1999 | Canavan |
| 6,170,950 | B1* | 1/2001 | Yoshida .............. G02C 1/02 351/110 |
| 6,502,939 | B2 | 1/2003 | Vignato |
| 6,588,893 | B2* | 7/2003 | Shimizu .............. G02C 1/02 351/110 |
| 6,776,482 | B1 | 8/2004 | Xiao |
| 8,157,372 | B1 | 4/2012 | Leung |
| 2002/0126252 | A1 | 9/2002 | Estrada et al. |
| 2003/0098948 | A1* | 5/2003 | Feldman .............. G02C 7/10 351/47 |
| 2003/0076476 | A1 | 7/2003 | Anger |
| 2005/0206837 | A1 | 9/2005 | Toulch |
| 2006/0275101 | A1* | 12/2006 | Feldman .............. G02C 9/04 411/456 |
| 2009/0073378 | A1* | 3/2009 | Tabacchi .............. G02C 1/02 351/140 |
| 2010/0073628 | A1* | 3/2010 | Leung .............. G02C 1/02 351/140 |
| 2011/0211155 | A1 | 9/2011 | Kim |
| 2011/0279770 | A1* | 11/2011 | Hwang Bo .............. G02C 1/02 351/110 |
| 2015/0316784 | A1* | 11/2015 | He .............. G02C 1/02 351/110 |
| 2016/0178926 | A1* | 6/2016 | Leung .............. G02C 5/12 351/110 |

FOREIGN PATENT DOCUMENTS

| | | |
|---|---|---|
| EP | 3176629 | 6/2017 |
| FR | 2748128 | 10/1997 |
| FR | 2828744 | 2/2003 |
| FR | 2880138 | 6/2006 |
| JP | 03242879 | 12/2001 |
| JP | 03476772 | 12/2003 |
| WO | 2000029896 | 5/2000 |
| WO | 2002075435 | 9/2002 |
| WO | 2002095482 | 11/2002 |
| WO | 2003050595 | 6/2003 |
| WO | 2005083496 | 9/2005 |
| WO | 2007104414 | 9/2007 |
| WO | 2011107410 | 9/2011 |

OTHER PUBLICATIONS

Written opinion for PCT application PCT/IB2019/057655 filed Sep. 9, 2019, from which the present application is a national phase entry.
U.S. Pat. No. 305843 issued Sep. 30, 1884 to RM Pierson While this would ideally be entered in the appropriate section above, the current form somehow doesn't reflect that patent numbers start at No. 1, and that there are therefore issued patents with a number smaller than 1000000. Such numbers are not allowed in the appropriate field hereinabove.

* cited by examiner

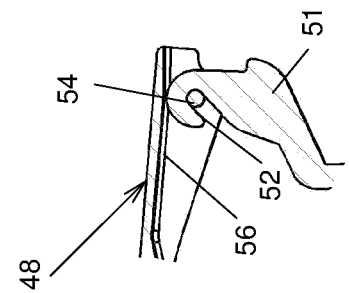
FIG. 4
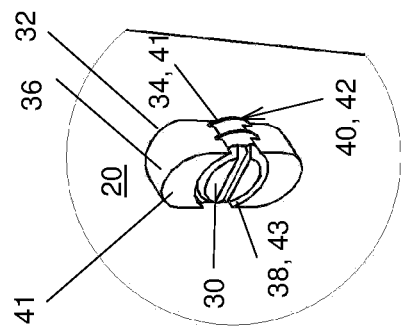
FIG. 6
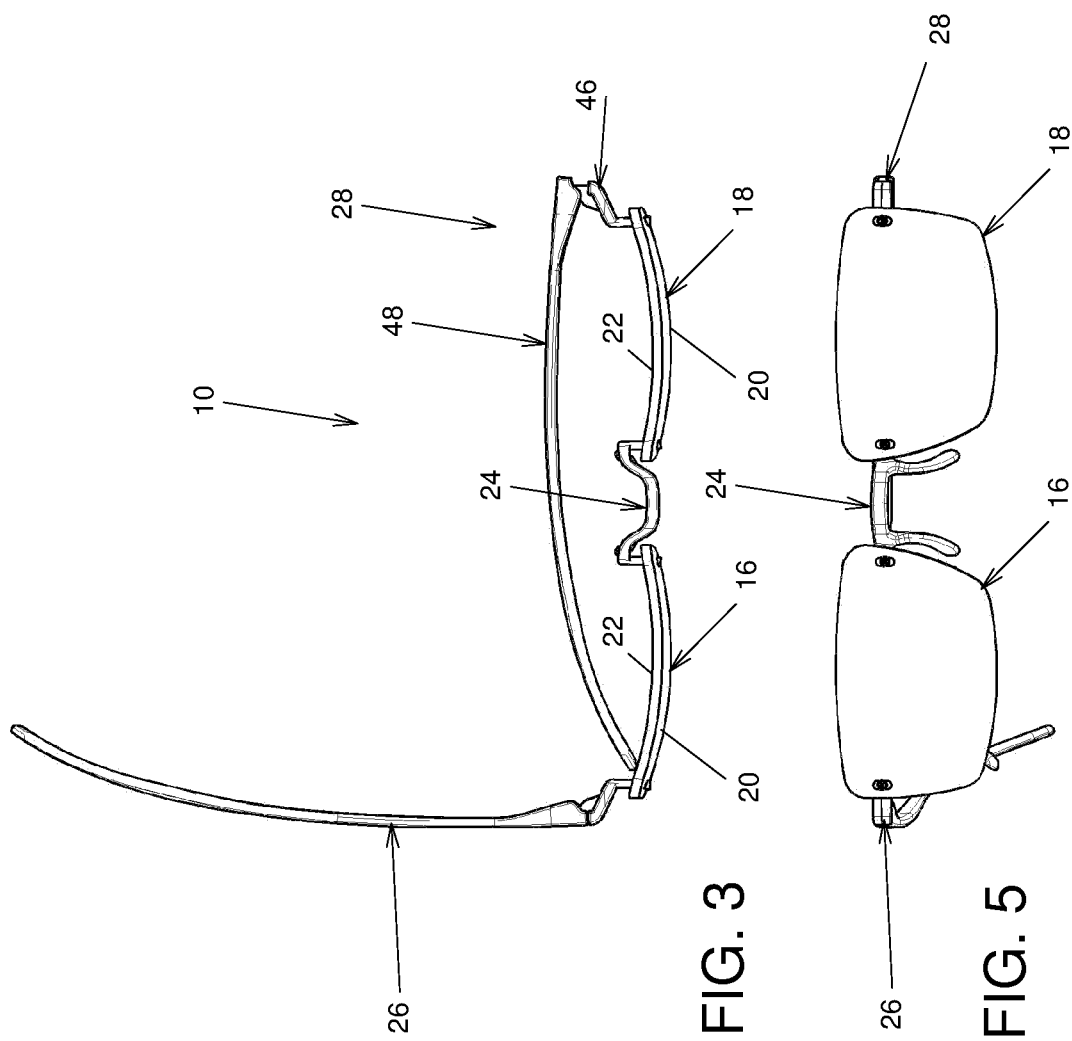
FIG. 3
FIG. 5

EYEGLASSES AND ASSEMBLY INCLUDING A COMPONENT MOUNTED TO A LENS

FIELD OF THE INVENTION

This invention relates generally to the field of lenses, and is more particularly concerned with a manner of mounting a component to a lens, such as side arms and bridges in rimless eyeglasses.

BACKGROUND OF THE INVENTION

A type of eyeglasses that is relatively popular is rimless eyeglasses. Instead of having a frame holding the lenses, these eyeglasses include lenses that are attached to each other through a bridge, the bridge including a nose pad. Also, side arms are attached directly to the lenses. In currently manufactured rimless eyeglasses, there is most of the time a portion of the bridge and sidearm, or a fastener used to attach these components, that protrudes on the surface of the lenses, due to the manner in which these components are attached to the lenses. These elements that protrude on the face of the lens are an inconvenience when cleaning the lenses and can be unaesthetic. In addition to above, the fastener also must be cut to a special length in order to properly finish the mounting, which can be time-consuming and relatively difficult to achieve if perfectly flush surfaces are desired. Furthermore, some novel mountings require the use of special glues or adhesives. This complicates the mounting process.

Against this background, there exists a need in the industry to provide novel eyeglasses and manners of mounting components to a lens.

An object of the present invention is therefore to provide improved manners of mounting components to lenses, for example in eyeglasses.

SUMMARY OF THE INVENTION

In a broad aspect, the invention provides eyeglasses, the eyeglasses defining substantially opposed eyeglasses lateral sides, the eyeglasses including: a pair of lenses provided in a substantially side-by-side relationship relative to each other between the eyeglasses lateral sides, each lens defining a lens front surface and an opposed lens rear surface; a bridge extending between and mounted to the lenses; a pair of side arms mounted each to a respective lens at one of the eyeglasses lateral sides; at least one of the bridge and side arms defining a mounting protrusion and at least one of the lenses defining a mounting aperture extending therethrough between the lens front and rear surfaces, the mounting protrusion being inserted in the mounting aperture; the mounting protrusion and the mounting aperture together defining a threaded fastener aperture extending substantially coaxial with the mounting aperture and delimited by a threaded fastener aperture peripheral surface, wherein part of the threaded fastener aperture peripheral surface is defined by the lens and part of the threaded fastener aperture peripheral surface is defined by the mounting protrusion; and a threaded fastener threaded in the threaded fastener aperture.

Advantageously, the proposed eyeglasses don't require custom fitting of fasteners to different lens shapes and may be assembled relatively easily using a conventional screwdriver once the mounting apertures have been formed in the lens. Also the various components of the eyeglasses occupy only a very small portion of the lens, and can be shaped and colored to have a very small visual impact on the appearance of the eyeglasses.

In another broad aspect, there is provided eyeglasses, the eyeglasses defining substantially opposed eyeglasses lateral sides, the eyeglasses including: a pair of lenses provided in a substantially side-by-side relationship relative to each other between the eyeglasses lateral sides, each lens defining respective opposed lens front and rear surfaces; a bridge extending between and mounted to the lenses; a pair of side arms mounted each to a respective one of the lenses at a respective one of the eyeglasses lateral sides; at least one of the bridge and side arms defining a mounting protrusion and at least one of the lenses defining a mounting aperture extending therethrough between the lens front and rear surfaces, the mounting protrusion being inserted in the mounting aperture; the mounting protrusion and the mounting aperture together defining a threaded bore extending from the lens front surface towards the lens rear surface and delimited circumferentially by a threaded bore peripheral surface, a part of the threaded bore peripheral surface being defined by the at least one of the lenses and another part of the threaded bore peripheral surface being defined by the mounting protrusion; and a threaded fastener threaded in the threaded bore; wherein the threaded fastener secures the mounting protrusion and the at least one of the lenses to each other by threadedly engaging both the mounting protrusion and the at least one of the lenses at distinct circumferencially spaced apart and axially aligned portions of the threaded fastener.

In yet another broad aspect, there is provided an assembly, including: a lens defining a lens first surface, an opposed lens second surface and a mounting aperture extending therebetween; a component mounted to the lens, the component defining a mounting protrusion inserted in the mounting aperture; the mounting protrusion and the mounting aperture together defining a threaded bore extending from the lens first surface towards the lens second surface and delimited circumferentially by a threaded bore peripheral surface, wherein a part of the threaded bore peripheral surface is defined by the at least one of the lenses and another part of the threaded bore peripheral surface is defined by the mounting protrusion; and a threaded fastener threaded in the threaded bore; wherein the threaded fastener secures the component and the lens to each other by threadedly engaging both the mounting protrusion and the lens at distinct circumferencially spaced apart and axially aligned portions of the threaded fastener.

In yet another broad aspect, there is provided eyeglasses, the eyeglasses defining substantially opposed eyeglasses lateral sides, the eyeglasses including: a pair of lenses provided in a substantially side-by-side relationship relative to each other between the eyeglasses lateral sides, each lens defining respective opposed lens first and rear surfaces; a bridge extending between and mounted to the lenses; a pair of side arms mounted each to a respective one of the lenses at a respective one of the eyeglasses lateral sides; at least one of the bridge and side arms defining a mounting protrusion and at least one of the lenses defining a mounting aperture extending therethrough between the lens first and rear surfaces, the mounting protrusion being inserted in the mounting aperture; the mounting protrusion and the mounting aperture together defining a threaded bore extending from the lens first surface towards the lens second surface and delimited circumferentially by a threaded bore peripheral surface defining a thread, the threaded bore peripheral surface including a peripheral surface protrusion portion defined by the mounting protrusion and a peripheral surface lens portion defined by the at least one of the lenses, the thread spiraling along the threaded bore peripheral surface and intersecting repeatedly alternatively the peripheral surface protrusion portion and the peripheral surface lens portion therealong; and a threaded fastener threaded in the threaded bore and threadedly engaging the thread.

There may also be provided eyeglasses or an assembly wherein the at least one of the bridge and side arms is the bridge.

There may also be provided eyeglasses or an assembly wherein the at least one of the bridge and side arms is one of the side arms.

There may also be provided eyeglasses or an assembly wherein the one of the side arms includes a connector and a side arm body hinged to each other, the connector defining the mounting protrusion.

There may also be provided eyeglasses or an assembly wherein the side arm body is hinged to the connector so as to be pivotable relative to the lenses between an extended position, wherein the side arm body extends away from the lens rear or second surfaces, and a retracted position, wherein the side arm body is substantially parallel to the lenses.

There may also be provided eyeglasses or an assembly wherein the mounting aperture is substantially oval-shaped.

There may also be provided eyeglasses or an assembly wherein the mounting aperture defines a substantially oval-shaped central portion and at least one extension portion extending from the central portion, the extension portion being a circular segment, the extension portion defining at least part of the threaded bore peripheral surface.

There may also be provided eyeglasses or an assembly wherein the central portion defines opposed central portion first and second ends, the extension portion being provided substantially midway between the central portion first and second ends.

There may also be provided eyeglasses or an assembly wherein the threaded fastener is a headless screw.

There may also be provided eyeglasses or an assembly wherein the threaded fastener and mounting protrusion are substantially flush with the lens front or first surface.

There may also be provided eyeglasses or an assembly wherein the mounting aperture and the mounting protrusion both taper in a direction leading from the lens front or first surface towards the lens rear or second surface.

There may also be provided eyeglasses or an assembly wherein the mounting aperture and the mounting protrusion both taper in a direction leading from the lens rear or second surface towards the lens front or first surface.

There may also be provided eyeglasses or an assembly wherein the mounting protrusion is substantially snugly received in the mounting aperture.

The present application claims priority from U.S. provisional patent application 62/743,934 filed Oct. 10, 2018, the contents of which is hereby incorporated by reference in its entirety. Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the Appended Drawings:

FIG. 3, in a top elevation view, illustrates the eyeglasses shown in FIGS. 1 and 2;

FIG. 4, in a top cross-section view, illustrates attachment of a pivotable side arm body to a connector, both part of the eyeglasses shown in FIGS. 1 to 3;

FIG. 5, in a front elevation view, illustrates the eyeglasses shown in FIGS. 1 to 3;

FIG. 6, in a perspective view, illustrates a mounting protrusion and a fastener both engaging a lens of the eyeglasses shown in FIGS. 1 to 3 and 5;

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Directional terminology, such as top and bottom, among others, refers to the orientation relative to an upstanding user wearing the eyeglasses with eyes facing the horizon. This terminology is used for clarity reasons and should not be used to unduly restrict the scope of the invention.

Figure 1:
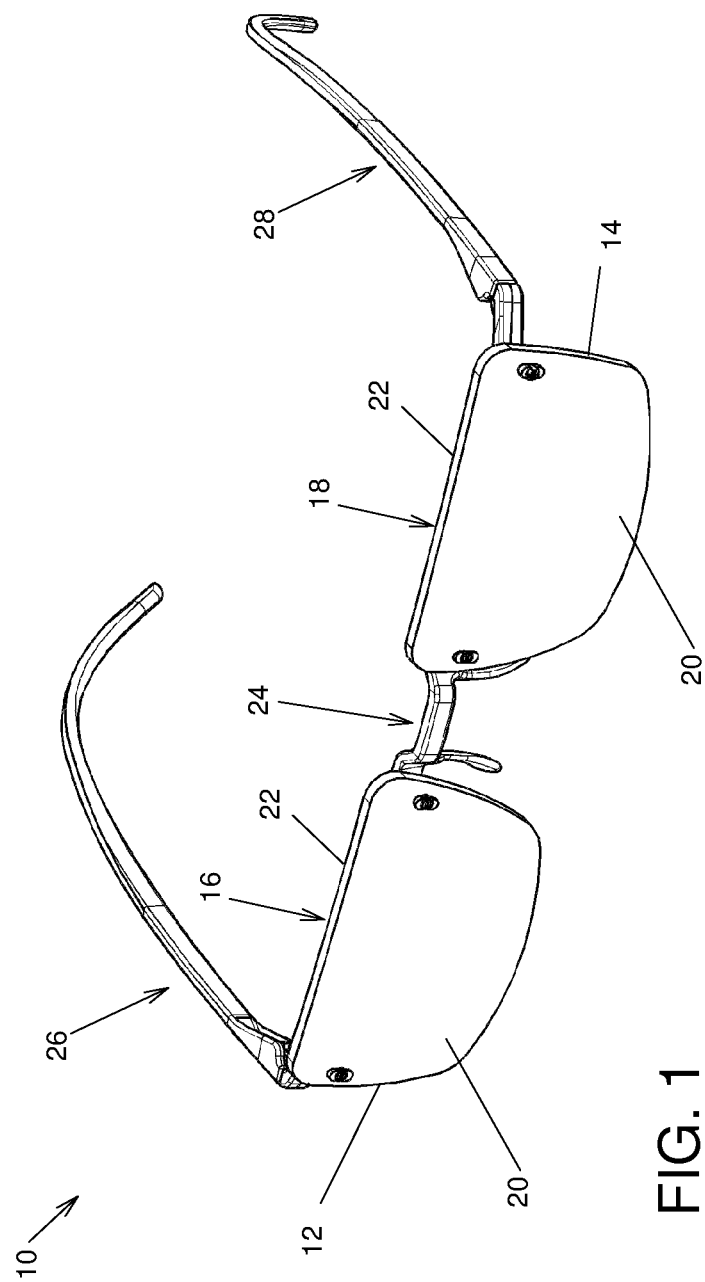
FIG. 1, in a perspective view, illustrate eyeglasses in accordance with an embodiment of the present invention.

Referring to FIG. 1, there are shown eyeglasses 10. While eyeglasses 10 are used to describe the invention, the eyeglasses 10 are a particular example of any assembly 10 that may incorporate the structures describe hereinbelow, in which a component is attached to a lens, such as, for example and non-limitingly, in optical instruments and the like. The eyeglasses 10 define substantially opposed eyeglasses lateral sides 12 and 14.

The eyeglasses 10 typically include a pair of lenses 16 and 18 provided in a substantially side-by-side relationship relative to each other between the eyeglasses lateral sides 12 and 14. However, eyeglasses including a single lens, such as the relatively large ones covering both eyes used in some specialized applications, are within the scope of the appended claims. Each lens 16 and 18 defines a lens front surface 20 and an opposed lens rear surface 22. A bridge 24 extends between the lenses 16 and 18 and is mounted thereto. Two side arms 26 and 28 are mounted each to a respective lens 16 and 18 at one of the eyeglasses lateral sides 12 and 14.

At least one of the bridge 24 and side arms 26 and 28 is mounted to the lenses 16 and 18 as follows. Typically, the bridge 24 and both side arms 26 and 28 are mounted similarly to the lenses 16 and 18. This case is assumed hereinbelow, with the understanding that having the bridge 24 and both side arms 26 and 28 mounted differently from each other to the lenses 16 and 18 is also possible. Also, other components in alternative optical assemblies are also similarly mounted to lenses. Briefly, the bridge 24 and the side arms 26 and 28 each define a mounting protrusion 36 that is inserted in a correspondingly shaped mounting aperture 32 extending through one of the lenses 16 and 18. The mounting protrusion 36 defines a recess 38 that, together with one of the lenses 16 and 18, define a threaded bore 40 in which a threaded fastener 30 is received. As the threaded fastener 30 both engages the mounting protrusion 36 and the lens 16 and 18, the component to which the protrusion 36 belongs is secured to the lenses 16 and 18. In opposition to currently used assembly methods in the field of eyeglasses, the threaded bore 40 has part of its circumference defined in the lens 16 or 18 and part of its circumference defined in the protrusion 36. This differs markedly from known attachment methods in which threaded bores have axially spaced portions in the lens and component to mount.

Figure 2:
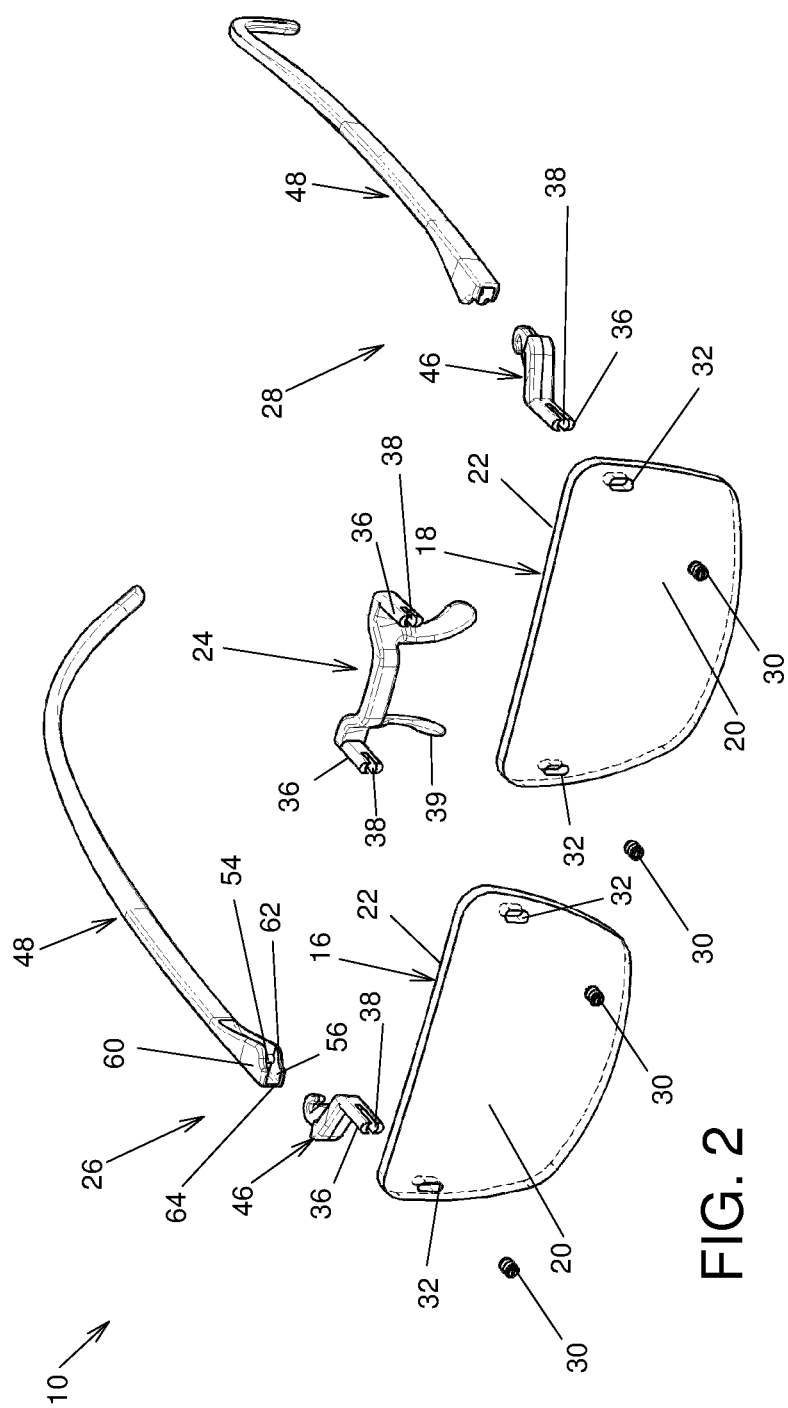
FIG. 2, in a perspective exploded view, illustrate the eyeglasses shown in FIG. 1.
Figure 8:
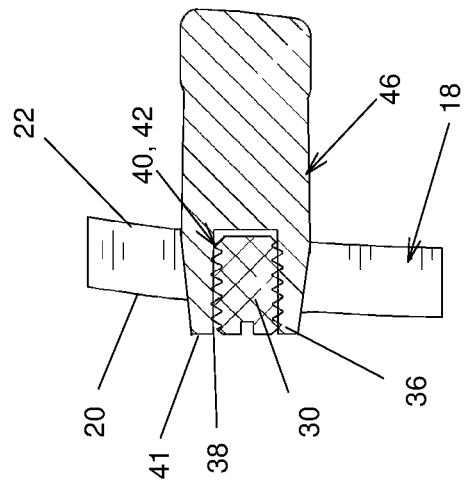
FIG. 8, in a top cross-sectional view along section line A-A of FIG. 7, illustrates the mounting protrusion and the fastener of FIG. 6 both engaging the lens of the eyeglasses.

More specifically, referring to FIG. 2, each lens 16 and 18 defines a pair of mounting apertures 32 extending therethrough between the lens front and rear surfaces 20 and 22. The mounting apertures 32 are for example generally oval-shaped to prevent any element mounted thereinto to unduly rotate axially. However, any other suitable shape for the mounting apertures 32 is within the scope of the invention. As seen for example in FIG. 6, each mounting aperture 32 is provided with at least one arcuate threaded portion 34, the threads 50 of which are more clearly seen in FIG. 8. The arcuate threaded portion 34 is a portion of the peripheral edge of the mounting aperture 32 that is shaped like an arc segment and provided with threads 50. In some embodiments, a pair of opposed arcuate threaded portions 34 are provided. In other embodiments (not shown in the drawings), only one arcuate threaded portion 34 is provided. The angle over which the arcuate threaded portion(s) 34 extend may total between 45 and 270 degrees, for example.

Returning to FIG. 2, the bridge 24 defines a mounting protrusion 36 at each lateral side thereof and a nose pad 39. Similarly, the side arms 26 and 28 also each define a respective mounting protrusion 36. As detailed below, the side arms 26 and 28 are two-pieces side arms each including a connector 46 and a side arm body 48 hingedly connected to each other. The connector 46 defines the mounting protrusion 36. However, other types of side arms 26 and 28, such as non-limitingly one-piece side arms 26 and 28, are within the scope of the present invention.

The mounting protrusions 36 are substantially elongated and are shaped similarly to the mounting apertures 32 so as to be fittingly, or snugly, inserted and mounted thereinto. This is so that, in some embodiments, the mounting protrusions 36 are unable to translate or rotate in the plane of the lenses 16 and 18 and remain fixed in the mounting apertures 32 so that only longitudinal movements through the mounting apertures 32 are allowed when the mounting protrusions 36 are not fastened to the lenses 16 and 18. However, the mounting protrusions 36 do not engage the arcuate threaded portion 34. Instead, the mounting protrusions 36 each define a threaded recess 38 extending axially thereinto from the front face 41 of the mounting protrusions 36 adjacent the actuate threaded portions 34. The threaded recess 38 is open laterally where facing the arcuate threaded portions 34.

The threaded recess 38 and the arcuate threaded portions 34 together define a threaded bore 40 extending, for example substantially co-axially with the mounting aperture 32, from the lens front surface 20 towards the lens rear surface 22. The threaded bore 40 may be completely closed at its end surface, or there may be a gap between the lens rear surface 22 and the end surface of the threaded recess 38. The threaded bore 40 is thus delimited circumferentially by a substantially cylindrical threaded bore peripheral surface 42 defining the threads 50 (seen for example in FIG. 8) that are engaged by the threaded fastener 30. Part of the threaded bore peripheral surface 42 is defined by the lens 16 or 18, in the arcuate threaded portion 34, and part of the threaded bore peripheral surface 42 is defined by the mounting protrusion 36, in the threaded recess 38. It should be noted that in alternative embodiments, the threaded bore peripheral surface 42 is tapered so that the threaded bore 40 is conical or frustro-conical, among other possibilities. Thus, the threaded bore peripheral surface 42 includes a peripheral surface protrusion portion 43 defined by mounting the mounting protrusion 36 and a peripheral surface lens portion 41 defined by the at least one of a lens 16 and 18. The thread 50 spirals along the threaded bore peripheral surface 42 and intersects repeatedly alternatively the peripheral surface protrusion portion 43 and the peripheral surface lens portion 41 therealong.

The threaded fasteners 30 is threaded in the threaded bore 40 and threadedly engages both the mounting protrusion 36 and the arcuate threaded portion 34 when mounted in the threaded recess 38. This secures the mounting protrusion 36 and the lenses 16 and 18 to each other as the threaded fasteners 30 threadedly engage both the mounting protrusion 36 and the lenses 16 and 18 at distinct circumferencially spaced apart and axially aligned portions of the threaded fastener 30. For example, and non-limitingly, the threaded fastener 30 takes the form of a headless screw, with a suitable head shape recess, such as common in Phillips and square head screws, among other possibilities. The threaded fastener 30 and mounting protrusion 36 may be flush with the lens front surface 20 when operatively mounted to the lenses 16 and 18, or may slightly protrude therefrom or be slightly recessed thereinto. Such differences in levels between the front face 41 of the mounting protrusion 36 and the lens front surface 20 are for example caused by the curvature of the lenses 16 and 18. These differences in levels are typically relatively small, for example 1 mm or less. The threaded fastener 30 and the front face 41 may be flush with each other.

Figure 10:
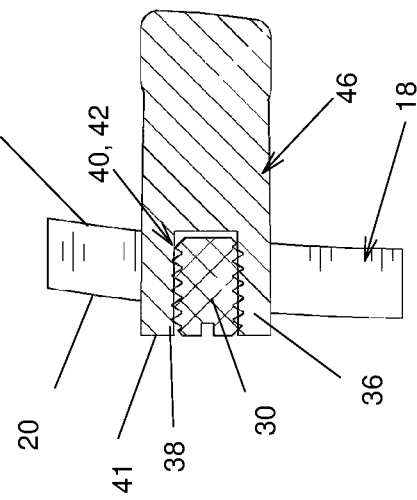
FIG. 10, in a side cross-sectional view along section line B-B of FIG. 7, illustrates an alternative mounting protrusion and the fastener of FIG. 6 both engaging the lens of the eyeglasses.
Figure 11:
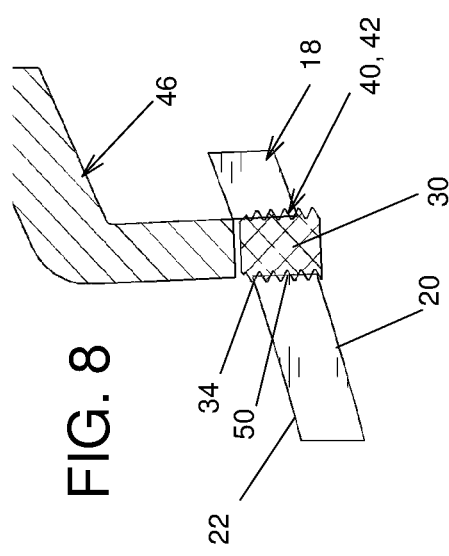
FIG. 11, in a side cross-sectional view along section line B-B of FIG. 7, illustrates another alternative mounting protrusion and the fastener of FIG. 6 both engaging the lens of the eyeglasses.
Figure 9:
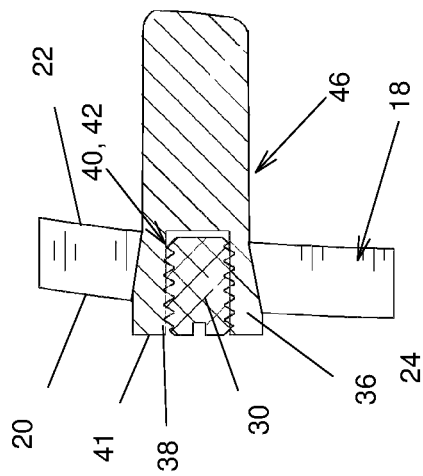
FIG. 9, in a side cross-sectional view along section line B-B of FIG. 7, illustrates the mounting protrusion and the fastener of FIG. 6 both engaging the lens of the eyeglasses.
Figure 7:
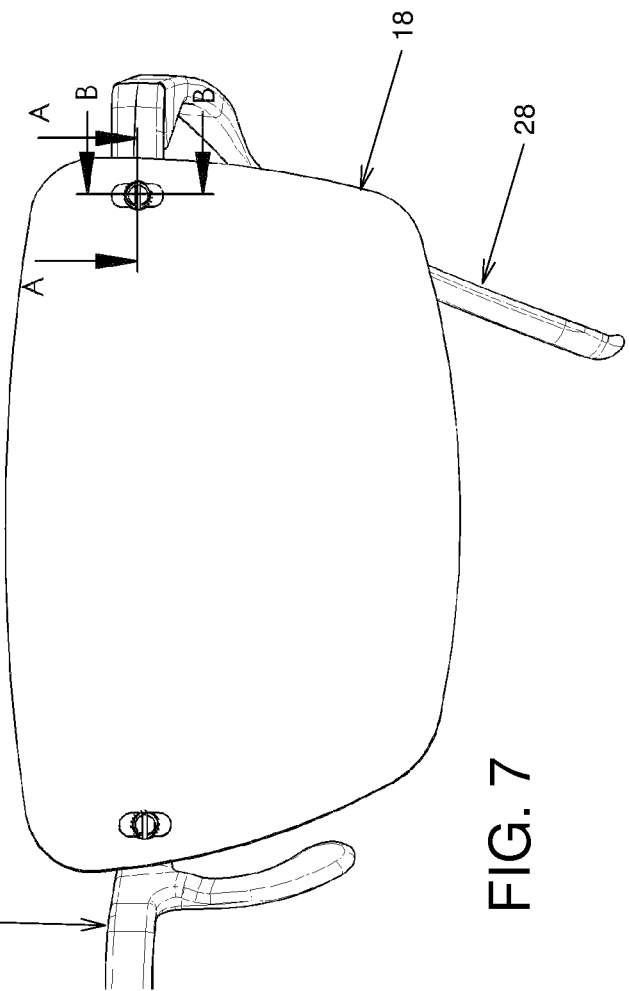
FIG. 7, in a partial front elevation view, illustrates the eyeglasses shown in FIGS. 1 to 3, 5 and 6.

While the threaded bore 40 and the mounting apertures 32 shown in the drawings have a substantially constant cross-sectional configuration therealong between the lens front and rear surfaces 20 and 22, it is within the scope of the invention to have such apertures of non-constant cross-section. More specifically, the mounting apertures 32 may taper in a direction leading towards the lens front surface 20, as seen in FIG. 10, and the mounting protrusions 36 may be similarly shaped. Therefore, when the threaded fastener 30 is tightened, the mounting protrusion 36 may then advance in the mounting aperture 32 until is firmly engaged with the lens 16 or 18. Similarly, the threaded bore 40 may taper in a direction leading towards the lens rear surface 22, as seen in FIG. 11. In this case, frictional forces between the threaded fastener 30 and the threaded bore peripheral surface 42 may be increased as the threaded fastener 30 is tightened.

Also, the arcuate threaded portion 34 may be located at any location along the mounting aperture 32. In the embodiment illustrated in the drawings, the arcuate threaded portions 34 are provided substantially midway between the top and bottom ends of the mounting apertures 32. However, an arcuate threaded portion 34 that would be at the top or at the bottom of the mounting aperture 32 is also within the scope of the invention.

Furthermore, the threaded bore 40 is laterally symmetrical relative to the mounting aperture 32, but alternative threaded bores 32 that are laterally offset relative to the mounting apertures 32 are within the scope of the invention. It is also possible, in alternative embodiments, to have more than one threaded bore 40 for each mounting aperture.

If described with respect to the shape of the portion of the lenses 16 and 18 that is removed to form the mounting aperture 32, the mounting aperture 32 can be considered as defining a substantially oval-shaped central portion and at least one extension portion extending from the central portion, the extension portion being a circular segment. The extension portion defines at least part of the threaded bore peripheral surface 42.

The sides arms 26 and 28 are substantially similar to each other, and only the side arm 28 is therefore described in details herein, the side arm 26 being a mirror image thereof. The side arm 28 includes the connector 46 and the side arm body 48. The side arm body 48 is hinged to the connector 46 so as to be pivotable relative to the lenses 16 an 18 between an extended position, seen for example in FIG. 1, wherein the side arm body 48 extends away from the lens rear surfaces 22, for example substantially perpendicular to the lenses 16 and 18, and a retracted position, seen for example in FIG. 3, wherein the side arm body 48 is substantially parallel to the lenses 16 and 18.

To that effect, the connector 46 defines an attachment 51 opposed to the mounting protrusion 36. The attachment 51 is configured to hingedly receive the side arm body 48. As seen in FIG. 4, the attachment 51 is for example substantially hook-shaped and defines a substantially vertically extending attachment recess 52 opening substantially horizontally and receiving a pin 54 of the side arm body 48 extending vertically in a suitably shaped side arm body recess 56. The side arm body recess 56 receives the attachment 51 thereinto and is shaped to allow insertion of the attachment 51 thereinto so that the pin 54 may be simultaneously be inserted in the attachment recess 52. To that effect, as seen for example in FIG. 2, the side arm body recess 56 is for example delimited at the top and bottom by substantially parallel top and bottom walls 60 and 62 between which extend an intermediate wall 64 and the pin 54. The pin 54 is spaced apart from the intermediate wall 64.

The attachment 51 is configured for receiving the pin 54 in the attachment recess 52 and only releasing the pin 54 if a suitably large force is exerted thereonto in a direction leading out of the attachment recess 52. For example, the attachment 51 is resiliently deformable and the attachment recess 52 defines a slightly enlarged portion opposed to its entrance so that when the pin 54 is fully inserted in the attachment recess 52, the pin 54 snaps to the attachment 51. Any other suitable manner of attaching the side arm body 48 and the connector 46 to each other is also usable. The side arm body 48 is substantially elongated and is curved opposed to the connector 46, as is conventional in eyeglasses.

It should be noted that in alternative embodiments, the threaded fastener 30 may be inserted from the back of the lenses 16 and 24, through a suitable aperture formed in the components to mount.

Although the present invention has been described hereinabove by way of preferred embodiments thereof, it can be modified, without departing from the spirit and nature of the subject invention as defined in the appended claims.

What is claimed is:

1. Eyeglasses, the eyeglasses defining substantially opposed eyeglasses lateral sides, the eyeglasses comprising:
a pair of lenses provided in a substantially side-by-side relationship relative to each other between the eyeglasses lateral sides, each lens defining respective opposed lens front and rear surfaces;
a bridge extending between and mounted to the lenses;
a pair of side arms mounted each to a respective one of the lenses at a respective one of the eyeglasses lateral sides;
at least one of the bridge and side arms defining a mounting protrusion and at least one of the lenses defining a mounting aperture extending therethrough between the lens front and rear surfaces, the mounting protrusion being inserted in the mounting aperture;
the mounting protrusion and the mounting aperture together defining a threaded bore extending from the lens front surface towards the lens rear surface and delimited circumferentially by a threaded bore peripheral surface, a part of the threaded bore peripheral surface being defined by the at least one of the lenses and another part of the threaded bore peripheral surface being defined by the mounting protrusion; and
a threaded fastener threaded in the threaded bore;
wherein the threaded fastener secures the mounting protrusion and the at least one of the lenses to each other by threadedly engaging both the mounting protrusion and the at least one of the lenses at distinct circumferencially spaced apart and axially aligned portions of the threaded fastener.

2. Eyeglasses, the eyeglasses defining substantially opposed eyeglasses lateral sides, the eyeglasses comprising:
a pair of lenses provided in a substantially side-by-side relationship relative to each other between the eyeglasses lateral sides, each lens defining respective opposed lens front and rear surfaces;
a bridge extending between and mounted to the lenses;
a pair of side arms mounted each to a respective one of the lenses at a respective one of the eyeglasses lateral sides;
at least one of the bridge and side arms defining a mounting protrusion and at least one of the lenses defining a mounting aperture extending therethrough between the lens front and rear surfaces, the mounting protrusion being inserted in the mounting aperture;
the mounting protrusion and the mounting aperture together defining a threaded bore extending from the lens front surface towards the lens rear surface and delimited circumferentially by a threaded bore peripheral surface defining a thread, the threaded bore peripheral surface including a peripheral surface protrusion portion defined by the mounting protrusion and a peripheral surface lens portion defined by the at least one of the lenses, the thread spiraling along the threaded bore peripheral surface and intersecting repeatedly alternatively the peripheral surface protrusion portion and the peripheral surface lens portion therealong; and
a threaded fastener threaded in the threaded bore and threadedly engaging the thread.

3. The eyeglasses as defined in claim 2, wherein the at least one of the bridge and side arms is the bridge.

4. The eyeglasses as defined in claim 2, wherein the at least one of the bridge and side arms is one of the side arms.

5. The eyeglasses as defined in claim 4, wherein the one of the side arms includes a connector and a side arm body hinged to each other, the connector defining the mounting protrusion.

6. The eyeglasses as defined in claim 5, wherein the side arm body is hinged to the connector so as to be pivotable relative to the lenses between an extended position, wherein the side arm body extends away from the lens rear surfaces, and a retracted position, wherein the side arm body is substantially parallel to the lenses.

7. The eyeglasses as defined in claim 2, wherein the mounting aperture is substantially oval-shaped.

8. The eyeglasses as defined in claim 2, wherein the mounting aperture defines a substantially oval-shaped central portion and at least one extension portion extending from the central portion, the extension portion being a circular segment, the extension portion defining at least part of the threaded bore peripheral surface.

9. The eyeglasses as defined claim 8, wherein the extension portion defines at least part of the threaded bore peripheral surface, the central portion also defining opposed central portion first and second ends, the extension portion being provided substantially midway between the central portion first and second ends.

10. The eyeglasses as defined in claim 2, wherein the threaded fastener is a headless screw.

11. The eyeglasses as defined in claim 10 wherein the threaded fastener and mounting protrusion are substantially flush with the lens front surface.

12. The eyeglasses as defined in claim 2, wherein the mounting aperture and the mounting protrusion both taper in a direction leading from the lens front surface towards the lens rear surface.

13. The eyeglasses as defined in claim 2, wherein the mounting aperture and the mounting protrusion both taper in a direction leading from the lens rear surface towards the lens front surface.

14. The eyeglasses as defined in claim 2, wherein the mounting protrusion is substantially snugly received in the mounting aperture.

15. An assembly, comprising:
a lens defining a lens first surface, an opposed lens second surface and a mounting aperture extending therebetween;
a component mounted to the lens, the component defining a mounting protrusion inserted in the mounting aperture;
the mounting protrusion and the mounting aperture together defining a threaded bore extending from the lens first surface towards the lens second surface and delimited circumferentially by a threaded bore peripheral surface, wherein a part of the threaded bore peripheral surface is defined by the at least one of the lenses and another part of the threaded bore peripheral surface is defined by the mounting protrusion; and
a threaded fastener threaded in the threaded bore;
wherein the threaded fastener secures the component and the lens to each other by threadedly engaging both the mounting protrusion and the lens at distinct circumferencially spaced apart and axially aligned portions of the threaded fastener.

16. The assembly as defined in claim 15, wherein the mounting aperture is substantially oval-shaped.

17. The assembly as defined in claim 15, wherein the mounting aperture defines a substantially oval-shaped central portion and at least one extension portion extending from the central portion, the extension portion being a circular segment, the extension portion defining at least part of the threaded bore peripheral surface.

18. The assembly as defined in claim 15, wherein the mounting aperture defines a substantially oval-shaped central portion and at least one extension portion extending from the central portion, the extension portion being a circular segment, the extension portion defining at least part of the threaded bore peripheral surface, the central portion also defining opposed central portion first and second ends, the extension portion being provided substantially midway between the central portion first and second ends.

19. The assembly as defined in claim 15, wherein the threaded fastener is a headless screw.

20. The assembly as defined in claim 19, wherein the threaded fastener and mounting protrusion are substantially flush with the lens first surface.

21. The assembly as defined in claim 15, wherein the mounting aperture and the mounting protrusion both taper in a direction leading from the lens first surface towards the lens second surface.

22. The assembly as defined in claim 15, wherein the mounting aperture and the mounting protrusion both taper in a direction leading from the lens second surface towards the lens first surface.

23. The assembly as defined in claim 15, wherein the mounting protrusion is substantially snugly received in the mounting aperture.

* * * * *